United States Patent [19]

Carlson et al.

[11] 4,410,940
[45] Oct. 18, 1983

[54] TRANSFER OF CONTROL METHOD AND MEANS AMONG HIERARCHICAL COOPERATING SEQUENTIAL PROCESSES

[75] Inventors: Eric D. Carlson, Los Gatos; Henry M. Gladney, Saratoga; Peter Lucas; Daniel L. Weller, both of San Jose; Stephen N. Zilles, Los Gatos, all of Calif.

[73] Assignee: International Business Machines Corporation, Armonk, N.Y.

[21] Appl. No.: 213,268

[22] Filed: Dec. 5, 1980

[51] Int. Cl.³ .................................... G06F 9/06
[52] U.S. Cl. ............................... 364/200; 364/300
[58] Field of Search ... 364/200 MS File, 900 MS File, 364/300

[56] References Cited

U.S. PATENT DOCUMENTS

| 3,614,740 | 10/1971 | Delagi et al. | 364/200 |
|---|---|---|---|
| 4,016,545 | 4/1977 | Lipovski | 364/200 |
| 4,084,224 | 4/1978 | Appell et al. | 364/200 |
| 4,149,240 | 4/1979 | Misunas et al. | 364/200 |
| 4,152,761 | 5/1979 | Louie | 364/200 |
| 4,173,782 | 11/1979 | Dixon | 364/200 |
| 4,297,743 | 10/1981 | Appell et al. | 364/200 |
| 4,330,822 | 5/1982 | Dodson | 364/200 |

FOREIGN PATENT DOCUMENTS 1240978 7/1971 United Kingdom .

OTHER PUBLICATIONS

W. A. Wulf et al., *Fundamental Structures of Computer Science*, Addison Wesley Pub. Co., Chapter 14, pp. 375-396 (1981).
E. I. Organick, *Computer System Organization*, Academic Press (1973), pp. 49-55.
Wang, Arne and Dahl, Ole–Johan, "Coroutine Sequencing in a Block Structured Environment", *BIT*, vol. 11, 1971, pp. 425–449.
Hanson, David R., "The SL5 Procedure Mechanism", *Communications of the ACM*, vol. 21, No. 5, May 1978, pp. 392–400.
Bobrow, Daniel G. and Wegbreit, "A Model and Stack Implementation of Multiple Environments", *CACM*, vol. 16, No. 10, Oct. 1973.

*Primary Examiner*—Mark E. Nusbaum
*Assistant Examiner*—Gary V. Harkcom
*Attorney, Agent, or Firm*—R. Bruce Brodie

[57] ABSTRACT

A method for transferring control between hierarchically related cooperating sequential processes P and Q executable in a multi-processing CPU environment. The method uses pointers to identify active and suspended processes. The method steps comprise generating and memory storing activation records; transferring control from process P to process Q, and updating the process pointers to record the suspension of process P and the activation of process Q; and resuming execution in the most recently executing subprocesses of Q by reference to the process pointers.

There is stored in memory one activation record per process. The record includes a pointer to the activation that is the parent of the process, a pointer to the most recently executing subprocess of the process, and information defining the current execution state of the process. These pointers are further constrained such that the set of activation records form the nodes of a tree whose arcs are defined by the parent pointers. The descendants of any node P, together with P itself, constitute the subprocesses of P. For any node P the process pointer of P always points to a subprocess of P. The transfer of control from process P to process Q involves the concurrent updating of the process pointers to record the suspension of process P and the activation of process Q.

3 Claims, 3 Drawing Figures

AN EXAMPLE OF A PARENTOF RELATION AND
THE TREE (GRAPH) IT DEFINES

AN EXAMPLE OF THE PROCESS POINTERS

TRANSFER OF CONTROL METHOD AND MEANS AMONG HIERARCHICAL COOPERATING SEQUENTIAL PROCESSES

TECHNICAL FIELD

This invention relates to cooperating sequential processes, and more particularly to methods and means for creating and maintaining synchronous computations among hierarchically arranged coroutining processes in a multi-processing, multi-programming CPU environment.

BACKGROUND

Coroutine processes are used where the states of two or more activities within a digital system change at different rates and must be maintained simultaneously during a computation. Relatedly, the transfer of control among coroutining processes is itself a complex computation arising from the necessity of saving and retrieving *state vector information for both the source and destination processes.* In this regard, in the usual calling sequence there is a clear distinction between the calling process and the called process. Transfer of control among (hierarchical) collections of coroutining processes is further complicated from the prior art necessity of a calling process having to possess information descriptive of the internal structure of every process it calls.

As described by A. C. Shaw, "The Logical Design of Operating Systems," Prentiss-Hall, Inc., New York, 1974 at pages 35–37, the calling processes of coroutines are explained by contrasting them will the calling processes of the more familiar subroutines.

In a subroutine program structure, there exists an unsymmetric master/slave relationship between a calling process P and its subroutine. Generally, a subroutine is entered at one of a fixed number of entry points.

All variables that are neither global nor parameters are undefined at entry. In contrast, coroutines are processes that may call each other but do not have this master/slave organization. The relationship between coroutines P and Q is *symmetric.* Each coroutine is both master and slave. On exit from a coroutine, its state is saved. The next time the coroutine is called, it resumes at exactly the point where it left previously with all of its internal variables unchanged. That is, the previous state of the coroutine is restored. The call on coroutine Q may be designated "RESUME Q". Before a coroutine can be "resumed" for the first time, its state must, of course, be initialized.

It is well appreciated that each coroutine process must be called, perform some work, and then resume some other process or end. Each coroutine call itself saves the address at which it is to resume execution (its resumption point) somewhere for use if it is resumed. This operation may be implemented using an instruction to exchange the top of a stack with instruction counter contents. In such an implementation, an instruction would first pop the old resumption point off the stack into a temporary register, then push the instruction counter onto the stack. Finally, the instruction would transfer the contents of the temporary register into the instruction counter. Since one address is popped off the upper stack and another address is pushed onto it, the stack pointer does not change.

Coroutining can be executed on stack machines such as the Burrough's B5700/B6700 series, as described by Organick, "Computer System Organization", Academic Press, 1973, pages 49 and 54. Alternatively, coroutines can be executed by an emulation equivalent on general register machines, such as the IBM System/370. Other state-of-the-art descriptions of coroutining processes may be found in Wang, et al, "Coroutine Sequencing in a Block Structured Environment", BIT, Vol. 11, 1971, pages 425–449; Hanson, et al, "The SL5 Procedure Mechanism", Communications of the ACM, May 1978, pages 392–400; Bobrow, et al, "A Model and Stack Implementation of Multiple Environments", Communications of the ACM, October 1978, pages 591–602; Knuth, "Fundamental Algorithms", 2nd edition, Addison Wesley, 1973, pages 190–196, and Dickson, U.S. Pat. No. 4,173,782, issued Nov. 6, 1979. These references taken singly or in combination, illustrate that transfer of control among collections of coroutines requires that the calling process has information descriptive of the internal process structure of the called process. Such a requirement complicates the control transfer mechanism and inhibits the modularization (subdividing) of the coroutining processes into subprocesses.

THE INVENTION

It is an object of this invention to both simplify the control transfer mechanism and to modularize the coroutine processes. More particularly, it is an object to devise method and means for simplifying the retention and restoration of the state of execution for collections of coroutining processes and for expediting the transfer of the "current point of control" among such processes.

These objects are achieved by creating, maintaining, and utilizing a tree structure current execution states such that (1) each node in the tree is a coroutine process; (2) the descendants of a node "P" in the tree are subprocesses of "P" (i.e., processes initialized by P), and (3) when control is transferred from any process P to any process Q, execution of the process P is suspended and the most recently executing subprocess of Q (including Q itself) is put into execution.

It is acknowledged that the prior art discloses that coroutines could be managed through trees of nodes (processes) in some type of multiple stack representation. However, the invention augments the basic tree structure with information about the most recently executing subprocess of every process (node) in the tree. This information is stored in a new component of the process state called the process pointer. Upon transfer of control from a process P to a process Q, the closest common ancestor of P and Q has its process pointer shifted from the (sub)process containing P to the subprocess containing Q, and the process pointer (in Q) is used (recursively) to find the most recently executing subprocess (contained in Q) to resume.

During the generating step, a pointer is stored in each process "P" or "Q". The pointer indicates which of its subprocesses (nodes in the tree) was most recently activated. During the updating step, the processed pointers are updated by the CPU overlapped with the transferring of control. The updating begins at the common ancestor of the two processes between which control is being transferred and terminates at the process where the execution is to be resumed.

DESCRIPTION OF THE PREFERRED EMBODIMENT AND INDUSTRIAL APPLICABILITY

Figure 1:
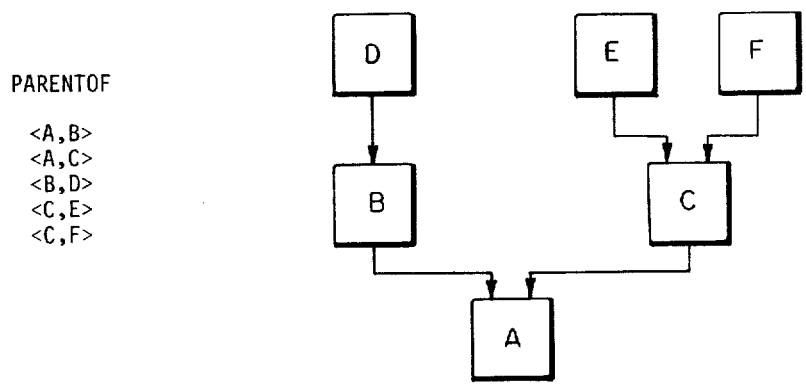
FIG. 1 depicts an in-degree 1 graph (tree) of hierarchically structured coroutines alternatively definable as a set of ordered pairs.

This invention is concerned with the transfer of control among coroutining sequential processes; that is, multiple processes that exist simultaneously with only one process proceeding at any given point in time. Critical of this invention is the structuring of state information with reference to the processes. First, the hierarchical relations among coroutining processes will be defined. In this context, the terms "subprocess", "active process" and "suspended process" will be defined. Second, a conceptual description invoking the transfer of control when the target process "Q" is active or suspended will be set out. Lastly, an IBM System/370 assembly level execution sequence shall complete the preferred embodiment description. The assembly level sequences will illustrate the transfer of control method and means of this invention with reference to process creation, transfer of control explicitly and implicitly, as well as process termination. The sequences will be expressed in the form of multiple tables. The tables collectively appear near the end of the specification and shall be referred to during the course of the description.

Procedures may be considered as a collection of statements headed by a procedure statement and terminated by an end statement. They may be considered a subset of a program which delimits the scope of names and is activated by reference to one of its entry names. In this regard, a procedure may be classified as an independently compliable unit of code. During execution, this procedure may have zero or more active instances. The active instances or activations are represented by an activation record. The activation record identifies the procedure of which it is an activation and contains execution information local to that activation of the procedure. The set of activation records, plus a global data area, represent the state of any computation. In this invention, the structure of the global state component will only be considered with reference to two registers. These are respectively the current activation register (CAR) and an instruction counter register (ICR). Their function will be described in a subsequent section.

At any instant in time, exactly one activation, the "current activation" is being executed. All other activations are "suspended". Relatedly, each activation record contains a "local instruction counter." For suspended activations, the local instruction counter denotes the program point from which execution is to continue in case the activation becomes reinstituted (current).

For the purposes of this invention, it is assumed that the activations have been hierarchically organized. That is, each activation (except a single-anchor activation) has exactly one other activation as its parent. This structure is represented by the binary relation PARENTOF, in which the pair <P,Q> of activations is in the relation if P is the parent of Q in the activation hierarchy. This hierarchy forms a tree called the *activation tree*. The mechanism by which the PARENTOF relationship is established is not herein described. An implementation should at least consider the fact that P is the PARENTOF Q if P initiates the activation Q.

FIG. 1 shows an example of the PARENTOF relationship and the tree of activations it defines. "A" is the anchor activation. As shown, "A" is the PARENTOF "B" and "C", and "C" is the parent of "E" and "F".

A machine-implementable process is considered to be any systematic sequence of machine operations required to produce a specified result. For the purposes of this invention, the process structure is defined over the tree of activations so that each subtree of the activation tree is a process. That is, a process consists of that set of activations that is in the transcribe and reflexive closure of the PARENTOF relationship for a given activation. The given activation is the *root* of the process. A process Q is a *subprocess* of a process P if the root activation of P is the PARENTOF the root activation of Q.

Each process is identified by the activation which is the root of the subtree making up the process. The process rooted by the anchor activation is called the "anchor process." As a result of the above definitions, some processes are contained in other processes and all processes are contained within the anchor process. For example, Process C consists of activations, C, E, and F and contains processes E and F. These activations are also contained in the anchor process A. Process A consists of activations A, B, C, D, E, and F. Referring again to FIG. 1, the subprocesses of "A" are processes "B" and "C". In turn, "B" has only "D" as a subprocess, whereas "D" itself has no subprocesses.

The *parent* of a process is the process identified by the PARENTOF of the root activation of the first process. Since the parent of every activation is unique, the PARENTOF relationship defines a unique chain of predecessor processes, the *parent chain*. For example, E,C,A is such a chain. For any process the processes in its parent chain are its ancestors (e.g., C,A are ancestors of E).

In this invention, a process becomes "suspended" if all contained activations are suspended. A process is "active" if the contained activations include a current activation. Referring again to FIG. 1, if E is the current activation, then processes A, C, and E are active while processes B, D and F are suspended.

The selection of the current and suspended activations is altered by the execution of a transfer control instruction within the current activation. This instruction takes as its operand a reference to the process that is to be made active. When that process is made active, the most recently executing activation within that process becomes the current activation, and all other activations are suspended. A process pointer mechanism is utilized to maintain informaton about and find the most recently executing activation of each process. As a result of this mechanism, the transfer of control from a process P to a process Q can be performed without process P (Q) having to know anything about the structure of process Q (P).

In the aforementioned Organick reference, the transfer of control between procedure activations was defined with respect to changes in the contents of an instruction counter (ICR) and a current activation register (CAR). Each activation is represented by an activation record, a computer-storable description of the state of the activation. The CAR designates the activation record of the current activation.

In this invention, *the state information in each activation record is augmented by a process pointer field.* The process pointer for an activation P can either point to itself or to any of the subprocesses of process P. Consider a process P. If the most recently executing activation of P is in one of P's subprocesses, say Q, then the process pointer of P will designate the root activation of subprocess Q. If the most recently executing activation of P is its own root activation, then the process pointer of P will designate that root activation.

As part of the transfer of control operation, it is necessary to ascertain the most recently executing activation for process P. Given process P, the most recent activation in a process may be found according to the invention by following the process pointer starting at the activation P and continuing until an activation is found *such that its process pointer points to itself.* The self-directing pointer indicates the activation that is the most recent activation in P.

Figure 2:
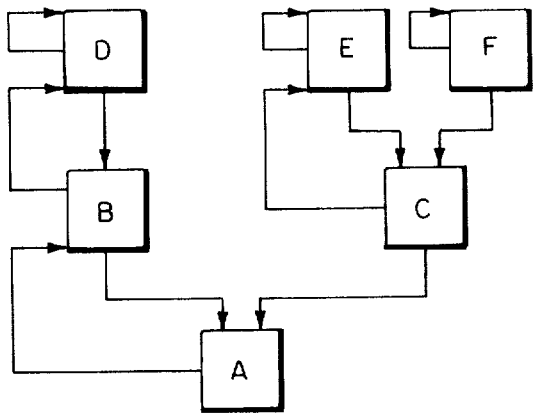
FIG. 2 depicts the hierarchically structured coroutines with an example of process pointers.

Referring now to FIG. 2, the most recently executing activation of process C is activation E. Further, the current activation is the most recently executing activation of the anchor process. This means that in FIG. 2, process D is the most recently executing activation of process A, and is the current activation. It should be noted, that the active processes are exactly those that occur on the chain of process pointers that begins with the anchor activation. This is termed the "active process chain." All other processes are suspended. Thus, process A, B, and D are active while processes C, E, and F are suspended.

Assuming the executing activation is P, the execution of the instruction "transfer-control Q", where Q is a reference to a process, changes the current point of execution and updates the CAR and ICR as follows:

Step 1

Save the current contents of the ICR in the local instruction counter of P. For example, if D in FIG. 2 executes "transfer-control E", then the current instruction counter for D is saved in D's activation record.

Step 2

Move the point of control to the most recently executing activation of the target process Q. There are two cases:

Case 1

The process Q is not in the executing chain.

First, determine the closest common ancestor R of P and Q in the PARENTOF tree. Then, beginning at the activation Q, consider each activation in the parent chain from Q up to but not including R and reset the process pointer of the parent of the activation being considered to point to the activation being considered. Beginning at Q, follow the process pointer chain to the most recently executing activation. Set the CAR to point to this activation. Load the ICR with the local instruction counter of activation now designated by the CAR.

In FIG. 2, if the instruction "transfer-control E" is performed in the executing activation D, then A is the closest common ancestor of D and E; the process pointer of the parent (C) of E is set to point to E (as it already does); and the process pointer of C's parent (A) is changed from B to C, indicating that B is suspended and C becomes executing, as does E. E then becomes the executing activation because its process pointer, which was not affected, points to E itself. Note that the same effect would have resulted if D had executed the instruction "transfer-control C" because C was suspended with E being its most recently executing activation. Hence, D did not need to know the structure of C to transfer control to its last point of execution.

Case 2

The process Q is in the executing process chain.

Then, reset the process pointer of Q to point to itself. The CAR is set to designate Q, and the ICR is loaded from the local instruction counter of Q.

In FIG. 2, if activation D executes the instruction "transfer-control A", then only the process pointer of A is changed to point to A itself; A becomes the executing activation and all other processes are suspended with their process pointers "remembering" their most recent point of execution.

The method of this invention is executable upon a computing system of the type including a CPU with a main store, input/output channel control unit, direct access storage devices, and other I/O devices coupled thereto. Such a system is described in G. M. Amdahl, et al, U.S. Pat. No. 63,400,371, issued Sept. 3, 1968 and entitled "Data Processing System". The Amdahl system includes as a "resource" any facility either of the computing system or of an "operating system" running thereon, which is required for execution of an executing task. Typical resources include a main store, I/O devices, the CPU, data sets, and control or processing programs. Furthermore, said systems are capable of "multi-programming" which pertains to the concurrent execution of two or more processes by a computing system. This can be managed on a computer running under IBM System/360 Operating System, as described in IBM publication GC28-6646, July 1973, and listed in IBM System/360 bibliography GA22-6822.

This invention may be advantageously practiced on a computing system of the IBM/360 type in which a sequence of machine instructions implementing the method may be used as part of an operating or data base system. In the subsequent discussion, the steps of the invention and its use in a relevant portion of a data base system will be described.

The invention is intended to be utilized in an operating system environment that contains conventional data management facilities, manages auxiliary storage, and provides traditional program language compiler and assembly capabilities. Although assembly level language is described in the aforementioned Amdahl patent and IBM publications, an introduction may be found in "A Programmer's Introduction to IBM System/360 Assembler Language", SC20-1646-6, reprinted in Nov. 1979. In this regard, the method steps are expressed in source assembly level language statements to be found in Tables 1-6.

The transfer of control instruction is realized in terms of an assembly language macro instruction RESUME, whose single operand is the address of the activation record of the root activation of the process to which control is to be transferred. The process executing the RESUME instruction will be called the *source process.* The process to which control will be transferred will be called the *target process.*

Tables 1-6 illustrate the realization of the RESUME instruction, the assumed context in which the instruction is executed, and examples of how the instruction would be used. Table 1 describes the representation of the activation record. Tables 2 and 3 show the code by which the instruction is realized. Tables 4-6 show example uses of the instruction. The RESUME instruction is executed within an existing process. The creation of a process (not described here) creates an activation record for the process and causes it to become the current process. The initial segment of storage for all activation records is described in Table 1. Each line of the table describes a field in the activation record. Most of the fields, those beginning "SAV . . . ", are common to the activation records normally used for procedure activations on 370 machines. These fields are used to store the contents of the general purpose registers of the 370 (SAVR14-SAVR12) to save the address of the creating process' activation record (SAVDSA) and to hold information about the kind and status of the activation.

To these fields this invention adds two fields: ARPARPT, representing the PARENTOF relationship, and ARPROPT, representing the process pointer for the process of which this activation is the root. ARPARPT holds the address of the activation record of the activation that is the parent of this activation. ARPROPT holds the address of the activation record of the root activation of one of this activation's subprocesses or the address of this activation record itself.

By convention on 370 machines, the CAR is held in general purpose register 13, and the ICR is transferred to general purpose register 14 for saving. Thus, the current ICR for an activation is found in the field SAVR14.

The function of the RESUME instruction is to save the execution state of the process executing it, to update the process pointers to make the target process active, to find the most recently executing activation within the target process, and to resume the execution of that activation. The realization of the RESUME instruction is divided into two parts: a short segment of code to initiate the transfer of control (Table 2) and a helper routine to actually carry out the required steps (Table 3). The first segment occurs with every use of the RESUME instruction. The second segment need only occur once per 370 address space. In Tables 2 and 3, the comments following the assembly language instructions refer to the same process as the CALLER and the target process as the CALLEE.

Instances of the macro instruction RESUME are replaced (by the assembler) by the three 370 instructions shown in Table 2. The first instruction loads the address of the root activation record for the target. The code of the helper routine is divided into four sections. The first section (lines 5-9) saves the state of the source activation in that activation's activation record. The second section (lines 13-38) updates the appropriate process pointers to make the target process active. The third section (lines 42-46) finds the most recently executing activation in the target process. The final section (lines 51-54) restores the execution of the most recently executing activation and reloads the ICR with the address of the instruction following the last instruction executed in that activation.

The main function of the first section of the helper routine is to save (line 6) the execution state (general purpose registers 14, 15 and 0-12) of the source process root activaton in its activation record. Since an entry to the helper routine register 14 contains the value of the ICR after the RESUME instruction was executed, the ICR for the source process is also saved. At this point in the process reference is made to the information activity with respect to general purpose register 15. Register 15 is a conventional target address register for transfers of control. It could be consistently replaced throughout tables 2 and 3 by any other register other than 13 or 14. The second instruction loads the address of the helper routine (Table 3) into register 14 in preparation to branch to it. The third instruction causes (1) the contents of register 14 to be put in the ICR (to effect a branch to the helper routine) and (2) the previous contents of the ICR to be put in register 14 (in preparation for saving the ICR value for the process executing RESUME).

The main work of the RESUME instruction is carried out in the helper routine (Table 3). This code could as well be embodied as microcode or as hard-wired logic in the machine implementation. The activation record for the source process is no longer needed by the transfer of control helper routine. Line 8 establishes addressability to the remainder of the helper routine code.

The second section of the helper routine updates the appropriate process pointers to suspend the source process and activate the target process. Rather than searching for the closest common ancestor of the source and target processes, each of the possible cases of step 2 of the process pointer update mechanism is pursued in sequence.

First, lines 13-22 check if the target process is an ancestor (on the parent chain) of the source process (subcase 2 of step 2). If the target process is found (lines 18 and 19), then a branch to line 36 updates the process pointer of the target process to point to its own root activation. No further updates of process pointers are necessary. If the target process is not found, then a test (line 20) is made to see if the anchor process has been reached. If not, the next process in the parent chain is investigated (line 21). Otherwise, subcase 2 of step 2 did not apply.

Subcase 1 of step 2 must then hold. In this subcase (lines 26-35), the process pointers of all activations on the parent chain of the target process are reset to point to the subprocess that contains the target process. In this subsection, register 4 has the address of the subprocess containing the target process, and register 5 has the address of its parent. Storing register 4 in the parent's process pointer correctly updates the parent's process pointer (line 32). Before updating the process pointer a check (lines 30 and 31) is made to see if the anchor process has already been updated. If so (line 31), this section of the update step is terminated.

The third section of the helper routine is used to find the most recently executing activation in the target process. Beginning with the target activation record (line 42), each activation in the process pointer chain is checked to see if its process pointer points at itself (line 45). If not, the next activation is checked (line 46). Otherwise, register 13 (the CAR) has the address of the activation whose execution is to be resumed.

The final section of the helper routine restores the execution state of the most recently executing activation (line 51), indicates a success resumption was made (line 52), and causes execution to continue with the instruction following the last instruction executed before that activation was last suspended (line 53).

Register 14 has the address of line m+1 in Table 5. The branch instruction will then load this address into the ICR and cause the resumption of E.

Now that process E is executing, it prints a message to that effect (line m+1), indicates that it is about to resume process B (line m+2), and executes the instruction RESUME ROUTINB (line m+3). Again, the lines replacing the RESUME instruction cause control to be transferred to the helper routine with the address of the root activation record of process B in general purpose register 15, and the address of line m+4 is in register 14.

Figure 3:
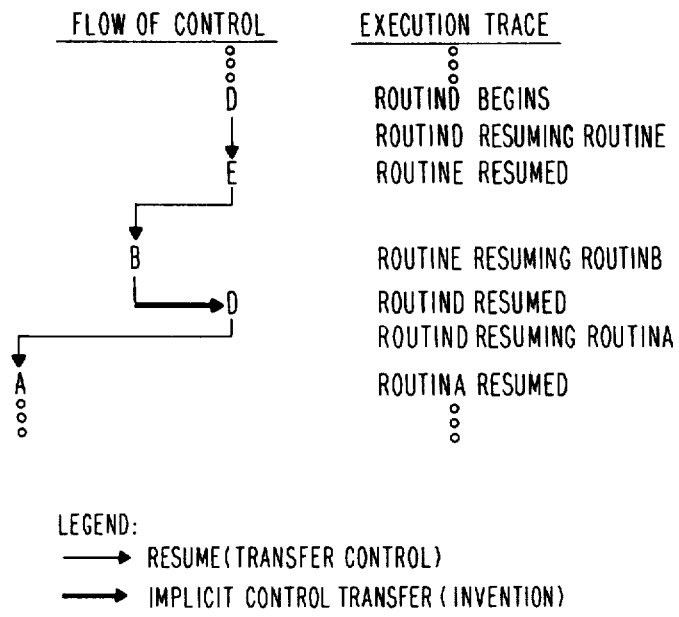
FIG. 3 illustrates a time sequence of process creation, coroutining interaction and termination.
Figure 3:
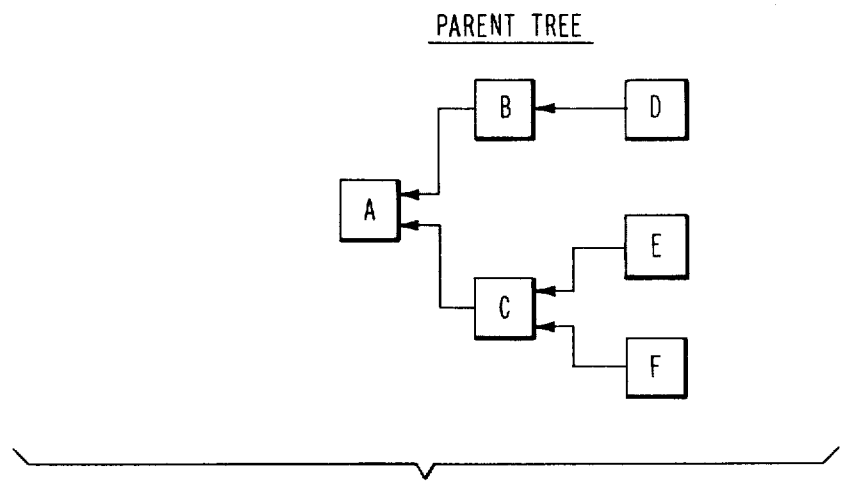

Table 4 shows an example segment of code that could be executed by process D in FIG. 2. The activation records for all the processes are assumed to have been created, and activation D is the currently executing activation. (General purpose register 13 holds the address of D's activation record.) As shown in FIG. 3, the execution of the segment of process D shown causes a transfer of control to process E, a resumption of process D, and finally a resumption of process A.

When the segment of process D in Table 4 begins execution, the process pointers of the other processes are assumed to be set up as shown in FIG. 2. Upon executing the macro instruction RESUME ROUTINE, control is transferred to the helper routine with the address of the activation record for ROUTINE in general purpose register 15 and the address of line n+4 in register 14. These registers and registers 0-12 are then saved in D's activation record by the first section of the helper routine. Subcase 2 does not apply to this transfer of control, so the first subsection of the second section of the helper routine terminates when the anchor activation is found. The second subsection of section two begins with the root activation of the target process E, and resets the process pointers of all of E's ancestors to point to the subprocess containing E. This updates C's process pointer to point to E (no change, as it already pointed to E) and A's process pointer to point to C (a change which causes B and D to become suspended). The third section of the helper routine finds that E's process pointer points to itself, so E is the activation in which execution is to resume. The final section of the helper routine restores E's execution state in which it is assumed that the first section of the helper routine saves the state of process E in its activation record. Once again, subcase 2 of Section 2 of the helper routine does not apply. (ROUTINB is not an ancestor of process E.) Subcase 1 of Section 2 begins at the target activation B and resets the process pointers of its ancestor to point to their subprocess that contains process B. This resets the process pointer of A to point to process B (thus, suspending processes C and E and activating B and the processes contained in B).

The third section of the helper routine tests if the process pointer of B designates B itself. If it does not, the process pointer of B designates process D. Therefore, process D must contain the most recently executing activation. The test on the process pointer is repeated on the process pointer of D. The process pointer of D does designate D itself; thus, identifying the root activation of D as the most recently executing activation in process B (which must be true, since this was the activation which initiated the transfer of control to process E). Hence, although process B was the process that was explicitly resumed, the process pointer mechanism found that subprocess D of B should be actually resumed as the most recently executing subprocess of B.

Section 4 of the helper routine restores the execution state of process D that was saved when control was transferred to process E. In particular, the ICR is set to indicate line n+4, the line following the instruction last executed in process D.

Process D prints out a message indicating that it was resumed (line n+4). It then indicates that it is about to resume process A (line n+5) and executes the instruction RESUME ROUTINA (line n+6) to transfer control to process A. This causes the address of the root activation record for process A to be put in general register 15 and register 14 to contain the address of the next instruction (line n+7) in ROUTIND. Control then passes to the helper routine.

The first section of the helper routine once again saves the execution state of process D. This time process A is an ancestor of process D, so subcase 2 of section 2 of the helper routine does apply. The search begins by checking if process D itself is the target process. It is not, so the parent of D is checked to see if it is the target process. Process E is the parent of process D and is not the target process. Hence, the test is made once again on the parent of process E. Process A is the parent of E and the target process so the test succeeds, causing a branch to update the process pointer of process A to point to its own root activation (thus suspending processes B and D).

Subcase 1 of section 2 of the helper routine is skipped when subcase 2 applies. Since process A's process pointer is reset to point to itself, it becomes its own most recently executing acitvation. Assuming that ROUTINA was last suspended after executing line p section 4 of the helper routine will resume process A at line p+1. This line will print out the final message in FIG. 3, indicating process A was resumed.

Having described the inventive steps, it should further be appreciated that the transfer control instruction, where the operand is a reference to a process, corresponds to the RESUME or CONTINUE instruction in most state-of-the-art coroutine mechanisms. If the activation record contains a field which identifies the last process to transfer control to this activation, then the operand of the transfer control instruction can be omitted and the contents of this field can be used to specify the target of the transfer.

The creation of processes and activations can be handled by a separate version of the transfer control instruction. The concept is to permit the operand of this transfer control instruction to be the name of a procedure to activate in the normal way, as well as the name of an existing activation. In the former circumstance, a new activation (and process) associated with the procedure is created. The process executing the creating transfer of control instruction becomes the PARENTOF the new activation. The local instruction counter of the new activation is set to point to the entry point for the procedure and the process pointer is set to point to the activation itself. This activation is then made current, according to the invention, as previously described. This set of steps corresponds to the normal CALL instruction.

If the target of the transfer control instruction is limited to ancestors or to the direct descendents of ancestors of the activation executing the instruction, then the foregoing methods can be simplified. Further, this restriction enhances the modularity by avoiding transfer into a subprocess of a suspended process. Incidentally, this limitation may be enforced by a limitation on the scope of names of activations.

It was unexpectedly observed that when the target of the transfer control was limited to ancestors or their direct descendants (subprocesses), the following consequences prevail.

1. A simple search finds the closest common ancestor of the target and the executing activation.

2. Only one parent pointer, namely that of the closest common ancester, need be changed to relect the transfer of control.

3. When control is transferred to an ancestor process or one of its direct descendants, the most inclusive of the processes that are suspended as a result of the transfer of control must be a direct descendant of the target process or of its parent, respectively. Hence, only the most inclusive suspended process is a possible target for later resumption. Because of this fact, the address of the most recently executing activation within the most inclusive suspended process can be stored directly in a new field in the activation record of the most inclusive suspended process and, upon resumption, that most recently executing activation can be resumed using the contents of this new field without requiring a search of the process pointers. With this simplification, there is no need to store or maintain the process pointers explicitly.

TABLE 1

| | MACRO ARPRT | | |
|---|---|---|---|
| AR | DSECT | | DESCRIPTION OF ACTIVATION RECORD |
| SAVFLGS | DS | H | FLAGS FOR PLI, NORMALLY X'80' |
| SAVOFF | DS | H | PLI FIELD THAT IS ZERO UNLESS LWS |
| SAVDDSA | DS | F | POINTER TO DSA OF CALLER (DYN DSA) |
| ARPROPT | DS | A | POINTER TO CURRENT SUBPROCESS AR |
| ARLIC | DS | 0F | LOCAL INSTRUCTION COUNTER FOR ACT |
| SAVR14 | DS | F | FOR SAVE OF REGISTER 14 (CALLER'S IC) |
| SAVR15 | DS | F | FOR SAVE OF REGISTER 15 (ENTRY PT) |
| SAVR0 | DS | F | FOR SAVE OF REGISTER 0 (POSS PARAM) |
| SAVR1 | DS | F | FOR SAVE OF REGISTER 1 (PARM OR AD) |
| SAVR2 | DS | F | FOR SAVE OF REGISTER 2 |
| SAVR3 | DS | F | FOR SAVE OF REGISTER 3 |
| SAVR4 | DS | F | FOR SAVE OF REGISTER 4 |
| SAVR5 | DS | F | FOR SAVE OF REGISTER 5 (STAT DSA AD) |
| SAVR6 | DS | F | FOR SAVE OF REGISTER 6 |
| SAVR7 | DS | F | FOR SAVE OF REGISTER 7 |
| SAVR8 | DS | F | FOR SAVE OF REGISTER 8 |
| SAVR9 | DS | F | FOR SAVE OF REGISTER 9 |
| SAVR10 | DS | F | FOR SAVE OF REGISTER 10 |
| SAVR11 | DS | F | FOR SAVE OF REGISTER 11 |
| SAVR12 | DS | F | FOR SAVE OF REGISTER 12 |
| SAVLWS | DS | A | ADDRESS OF PLI'S LWS DSA |
| SAVNAB | DS | F | ADDRESS OF NEXT AVAIABLE BYTE (PLI) |
| SAVPNAB | DS | F | PROLOGUE NAB |
| SAVBENB | DS | H | BLOCK ENABLE CELL (PLI) |
| SAVCENB | DS | H | CURRENT ENABLE CELL (PLI) |
| ARPARPT | DS | 0F | POINTER TO PARENT ACTIVATION |
| SAVSDSA | DS | F | STATIC (PARENT) DSA (ACTIVATION) |
| SAVPLI | DS | 7F | SPACE FOR VARIOUS PLI FIELDS |
| AREND | DS | 0F | ADDRESS OF END OF STANDARD ACT REC |
| ARLNG | EQU | AREND-AR | LENGTH OF STANDARD DSA |
| | EJECT | | |
| | MEND | | |

TABLE 2

| Inst. No. | | | | |
|---|---|---|---|---|
| | &SYMB | MACRO RESUM &TARGET | | RESUME AR WHOSE ADDR IS IN THE TARGT |
| 1 | | L | 15,&TARGET | GET ENTRY POINT ADDR TO GO TO |
| 2 | | L | 14,=V(RHELP) | GET ADDRESS OF TRANSFER ASSIST RTN |
| 3 | | BALR | 14, 14 | GO TO ENTRY AID CODE & SAVE EXIT PT |
| | | MEND | | |

TABLE 3

| Line # | | | |
|---|---|---|---|
| 1 | RHELP | CSECT | |
| 2 | | | |
| 3 | SAVE THE STATE (REGISTERS) OF THE CALLER IN HIS AR (SAVE AREA) | | |
| 4 | | | |
| 5 | USING | AR,13 | ADDRESSABILITY TO CALLER'S SAVE AREA |
| 6 | STM | 14,12,SAVR14 | SAVE CALLER'S REGISTERS |
| 7 | DROP | 13 | NOW DONE WITH CALLER'S SAVE AREA |
| 8 | BALR | 10,0 | GET LOCAL ADDRESSABILITY |
| 9 | USING | *,10 | |
| 10 | | | |
| 11 | RESET THE PROCESS POINTER AT THE APPROPRIATE PLACE IN THE CHAIN | | |
| 12 | | | |
| 13 | LR | 6,13 | MAKE THE CALLER ITS OWN CUR ANCESTOR |
| 14 | USING | AR,6 | SET ADDRESSABILITY TO CALLER'S ANC. |
| 15 | CR | 6,15 | IS CALLER THE CALLEE |

TABLE 3-continued

| Line # | | | | |
|---|---|---|---|---|
| 16 | | BE | RHTERM | IF SO TERMINATE UPDATE OF PROC PTRS |
| 17 | RHCLRLP | L | 6,ARPARPT | MAKE CALLERS NEXT ANCESTOR CURRENT |
| 18 | | CR | 6,15 | IS CALLER'S CUR ANCESTOR THE CALLEE |
| 19 | | BE | RHTERM2 | IF SO TERMINATE UPDATE OF PROC PTRS |
| 20 | | C | 6,ARPARPT | IS THIS THE ROOT AR |
| 21 | | BNE | RHCLRLP | IF NOT, TRY CALLER'S NEXT ANCESTOR |
| 22 | | DROP | 6 | |
| 24 | | | CASE 2 of STEP 2 DID NOT APPLY SO NOW TRY CASE 1 | |
| 25 | | | | |
| 26 | | LR | 5,15 | MAKE THE CALLEE ITS OWN CUR ANCESTOR |
| 27 | RHCLELP | LR | 4,5 | SET R4 TO CALLEE'S CUR ANCESTOR |
| 28 | | USING | AR,5 | SET UP ADDRESSABILITY TO CALLEE ANC. |
| 29 | | L | 5,ARPARPT | SET R5 TO CALLEE'S NEXT ANCESTOR |
| 30 | | CR | 5,4 | DO R4 AND R5 POINT AT THE ROOT AR |
| 31 | | BE | RHTERM | IF SO, THEN PROC PTR UPDATE IS DONE |
| 32 | | ST | 4,ARPROPT | RESET PROC OF CUR ANCESTOR'S PARENT |
| 33 | | B | RHCLELP | TO PROCESS CALLER'S NEXT ANCESTOR |
| 34 | | DROP | 5 | |
| 35 | | USING | AR,6 | REESTABLISH CALLER'S ANCESTOR ADDRESS |
| 36 | RHTERM2 | ST | 6,ARPROPT | SET CALLEE'S PROC PTR TO SELF |
| 37 | | DROP | 6 | |
| 38 | RHTERM | DS | 0H | COMMON TERMINATION OF PROC PTR UPDATE |
| 39 | | | | |
| 40 | | | FIND THE CURRENT ACTIVATION VIA THE CALLEE'S PROCESS POINTER CHAIN | |
| 41 | | | | |
| 42 | RHCURLP | LR | 13,15 | SET UP POSSIBLE MOST CURRENT AR |
| 43 | | USING | AR,13 | SET UP ADDRESSABILITY TO THAT AR |
| 44 | | L | 15,ARPROPT | GET THE PROC PTR TO THIS OR NEXT AR |
| 45 | | CR | 13,15 | SET IF PROC PTR POINTS TO THIS AR |
| 46 | | BNE | RHCURLP | IF NOT, THEN USE PROC PTR AS NEXT AR |
| 47 | | | | |
| 48 | | | HAVE FOUND THE MOST RECENTLY EXECUTING ACTIVATION, SO RESTORE | |
| 49 | | | REGISTERS AND RESUME IT. | |
| 50 | | | | |
| 51 | | LM | 14,12,SAVR14 | RESTORE CALLEE'S REGISTER'S |
| 52 | | SR | 15,15 | CLEAR REGISTER 15 FOR NORMAL RETURN |
| 53 | | BR | 14 | RESUME THE CALLEE |
| 54 | | DROP | 13 | |

TABLE 4

| Line # | | | |
|---|---|---|---|
| 1 | ROUTIND | GSECT | |
| n | | PRINT | 'ROUTIND BEGINS' |
| n+1 | | | |
| n+2 | | PRINT | 'ROUTINE RESUMING ROUTINE' |
| n+3 | | RESUM | ROUTINE |
| n'4 | | PRINT | 'ROUTIND RESUMED' |
| n+5 | | PRINT | 'ROUTIND RESUMING ROUTINA' |
| n+6 | | RESUM | ROUTINA |
| | | END | |

TABLE 5

| Line # | | | |
|---|---|---|---|
| 1 | ROUTINE | CSECT | |
| m | | RESUME ROUTINA | |
| m+1 | | PRINT "ROUTINE RESUMED" | |
| m+2 | | PRINT "ROUTINE RESUMING ROUTINB" | |
| m+3 | | RESUME ROUTINB | |
| m+4 | | PRINT "ROUTINE RESUMED" | |
| | | END | |

TABLE 6

| | | |
|---|---|---|
| 1 | ROUTINA | CSECT |
| p | | RESUME ROUTINB |
| p+1 | | PRINT "ROUTINA RESUMED" |
| | | END |

It is clear that the sequence of ICALL MACROS executed by each process in Tables 2-7 defines tree graph relations among the processes (FIG. 1). Further, the RESUME and RHELP MACROS effectuate the transfers of control between the processes, update the activation records, and cause execution to resume in the most recently executing subprocess of the target activation. Thus, according to this invention, the transfer of control involves (1) suspending the calling process and (2) reactivating the most recent current activation of the called process, both occurring by way of execution of a transfer control instruction.

A critical observation in this invention was the need to identify the most recently executing process from the tree in order to permit a called process to be subdivided without changing transfer of control instructions in calling processes—the identification being kept within the node (process) description, such that execution of the transfer of control instruction updates that description. It is this observation upon which the advance in the art is predicated.

We claim:

1. A digital computer implemented method for maintaining synchronous computations among a set of recursively nested cooperating sequential processes, comprising the steps of:
   (a) generating and storing in memory an activation record (AR) for each process, each AR including a pointer (PARENT) to the AR of the immediate antecedent process, the set of PARENT pointers defining a tree graph ordering or nesting structure, each subtree of which is itself such a structure with a root process and descendent processes, each AR further including a pointer (PROCESS) to the AR of the most recently activated process within the least inclusive subtree ordering of which it is a member, and information defining the current execution state of the process; and
   (b) responsive to execution of an instruction, transferring control to a process within the set of processes:
      (i) ascertaining the nearest antecedent of both the transferring and the transferred to processes using the PARENT pointers;
      (ii) updating the PROCESS pointers of all the processes between the closest antecedent process and the transferred to process so that they designate the antecedents in sequence to the transferred to process;
      (iii) following the PROCESS pointers from the transferred to process to the most recently executing process in the subtree it roots, and resuming the execution of the transferred to process.

2. A digital computer implemented method for maintaining synchronous computations among a set of recursively nested cooperating sequential processes, comprising the steps of:
   (a) generating and storing in memory an activation record (AR) for each process, each AR including a pointer (PARENT) to the AR of the immediate antecedent process, the set of PARENT pointers defining a tree graph ordering or nesting structure, each subtree of which is itself such a structure with a root process and descendent processes, each AR further including a pointer (PROCESS) to the AR of the most recently activated process within the least inclusive subtree ordering of which it is a member, and information defining the current execution state of the process; and
   (b) responsive to execution of an instruction, transferring control to an antecedent of the transferring process:
      (i) updating the process pointers of the antecedent process to designate itself as the most recently executing process in the subtree it roots; and
      (ii) resuming the execution of the transferred to process.

3. A digital computer implemented method for maintaining synchronous computations among a set of recursively nested cooperating sequential processes, comprising the steps of:
   (a) generating and storing in memory an activation record (AR) for each process, each AR including a pointer (PARENT) to the AR of the immediate antecedent process, the set of PARENT pointers defining a tree graph ordering or nesting structure, each subtree of which is itself such a structure with a root process and descendent processes, each AR further including a pointer (PROCESS) to the AR of the most recently activated process within the least inclusive subtree ordering of which it is a member, and information defining the current execution state of the process; and
   (b) responsive to execution of an instruction, transferring control to a process that is the immediate descendent of an antecedent of the transferring process:
      (i) ascertaining the antecedent of both the transferring and the transferred to process by comparing the PARENT pointers of the transferring process's antecedents to the PARENT pointer of the transferred to process;
      (ii) updating the PROCESS pointers of the common antecedent to point to the transferred to process; and
      (iii) following the PROCESS pointers from the transferred to process to the most recently executing process in the subtree it roots, and resuming the execution of the transferred to process.

* * * * *